United States Patent
Tinsley et al.

(10) Patent No.: US 6,965,592 B2
(45) Date of Patent: Nov. 15, 2005

(54) DISTRIBUTED SIGNALING SYSTEM 7 (SS7) MESSAGE ROUTING GATEWAY

(75) Inventors: Robert John Tinsley, Chapel Hill, NC (US); Peter Joseph Marsico, Carrboro, NC (US); Lee Barfield Smith, Apex, NC (US); Virgil Elmer Long, Raleigh, NC (US); Gregory Allen Hunt, Morrisville, NC (US)

(73) Assignee: Tekelec, Calabasas, CA (US)

( * ) Notice: Subject to any disclaimer, the term of this patent is extended or adjusted under 35 U.S.C. 154(b) by 184 days.

(21) Appl. No.: 09/768,881

(22) Filed: Jan. 24, 2001

(65) Prior Publication Data

US 2002/0131400 A1 Sep. 19, 2002

(51) Int. Cl.[7] .............................. H04L 12/66; H04J 3/16
(52) U.S. Cl. ...................... 370/352; 370/522; 370/466
(58) Field of Search ................................ 370/351–356, 370/400–402, 466–467, 522; 379/900, 89.17, 221.08, 221.12

(56) References Cited

U.S. PATENT DOCUMENTS

| | | | |
|---|---|---|---|
| 5,008,929 A | 4/1991 | Olsen et al. | 379/112 |
| 5,142,622 A | 8/1992 | Owens | 395/200 |
| 5,208,811 A | 5/1993 | Kashio et al. | 370/94.1 |
| 5,239,542 A | 8/1993 | Breidenstein et al. | 370/79 |
| 5,315,641 A | 5/1994 | Montgomery et al. | 379/94 |
| 5,384,840 A | 1/1995 | Blatchford et al. | 379/229 |
| 5,420,916 A | 5/1995 | Sekiguchi | 379/230 |
| 5,430,727 A | 7/1995 | Callon | 370/85.13 |
| 5,509,010 A | 4/1996 | La Porta et al. | 370/68.1 |
| 5,568,487 A | 10/1996 | Sitbon et al. | 370/94.1 |
| 5,581,558 A | 12/1996 | Horney, II et al. | 370/401 |
| 5,583,927 A | 12/1996 | Ely et al. | 379/207 |
| 5,586,177 A | 12/1996 | Farris et al. | 379/230 |
| 5,638,431 A | 6/1997 | Everett et al. | 379/115 |
| 5,640,446 A | 6/1997 | Everett et al. | 379/115 |
| 5,651,002 A | 7/1997 | Van Seters et al. | 370/392 |
| 5,657,452 A | 8/1997 | Kralowetz et al. | 395/200.57 |
| 5,664,102 A | 9/1997 | Faynberg | 395/200.76 |
| 5,675,635 A | 10/1997 | Vos et al. | 379/113 |
| 5,680,437 A | 10/1997 | Segal | |
| 5,680,552 A | 10/1997 | Netravali et al. | 395/200.2 |
| 5,696,809 A | 12/1997 | Voit | 379/5 |

(Continued)

FOREIGN PATENT DOCUMENTS

| | | |
|---|---|---|
| EP | 0 853 411 A2 | 7/1998 |
| EP | 1 026 861 A2 | 8/2000 |

(Continued)

OTHER PUBLICATIONS

Pai, "In–Building Wireless: The Next Generation," TelephonyOnline.com, pp. 1–4 (Jun. 30, 2004).

Handa, "In Building Wireless: The Next Generation," TMCnet.com, pp. 1–7 (Feb. 12, 2004).

(Continued)

*Primary Examiner*—Steven Nguyen
(74) *Attorney, Agent, or Firm*—Jenkins, Wilson & Taylor, P.A.

(57) ABSTRACT

A distributed gateway includes distributed gateway routing elements co-located with SS7 network elements. Each distributed gateway routing element performs an SS7 routing function, such an MTP level 3 routing function. The distributed gateway routing elements communicate with each other over a virtual bus that guarantees quality of service for SS7 message packets. Accordingly, the distributed gateway routing elements set quality of service parameters in the SS7 message packets that are forwarded over the virtual bus.

46 Claims, 9 Drawing Sheets

U.S. PATENT DOCUMENTS

| | | |
|---|---|---|
| 5,701,301 A | 12/1997 | Weisser, Jr. .................. 370/428 |
| 5,706,286 A | 1/1998 | Reiman et al. .............. 370/401 |
| 5,712,903 A | 1/1998 | Bartholomew et al. ....... 379/89 |
| 5,732,213 A | 3/1998 | Gessel et al. .......... 395/200.11 |
| 5,740,374 A | 4/1998 | Raffali-Schreinemachers .... 395/200.68 |
| 5,761,281 A | 6/1998 | Baum et al. .............. 379/93.29 |
| 5,761,500 A | 6/1998 | Gallant et al. ............... 395/610 |
| 5,764,750 A | 6/1998 | Chau et al. .................. 379/229 |
| 5,764,955 A | 6/1998 | Doolan ....................... 395/500 |
| 5,768,361 A | 6/1998 | Cowgill ...................... 379/229 |
| 5,768,525 A | 6/1998 | Kralowetz et al. ..... 395/200.58 |
| 5,774,695 A | 6/1998 | Autrey et al. ............... 395/500 |
| 5,781,534 A | 7/1998 | Perlman et al. ............. 370/248 |
| 5,787,255 A | 7/1998 | Parlan et al. .......... 395/200.63 |
| 5,793,771 A | 8/1998 | Darland et al. .............. 370/467 |
| 5,802,285 A | 9/1998 | Hirviniemi ............... 395/200.8 |
| 5,805,587 A | 9/1998 | Norris et al. ................ 370/352 |
| 5,812,781 A | 9/1998 | Fahlman et al. ....... 395/200.56 |
| 5,815,669 A | 9/1998 | Lee et al. .............. 395/200.68 |
| 5,828,844 A | 10/1998 | Civanlar et al. ....... 395/200.58 |
| 5,838,782 A | 11/1998 | Lindquist ..................... 379/230 |
| 5,852,660 A | 12/1998 | Lindquist et al. ........... 379/230 |
| 5,867,495 A | 2/1999 | Elliott et al. ................ 370/352 |
| 5,870,565 A | 2/1999 | Glitho .................... 395/200.79 |
| 5,872,782 A | 2/1999 | Dendi ......................... 370/385 |
| 5,878,129 A | 3/1999 | Figurski et al. ............. 379/230 |
| 5,889,954 A | 3/1999 | Gessel et al. .......... 395/200.53 |
| 5,892,822 A | 4/1999 | Gottlieb et al. ............. 379/220 |
| 5,912,887 A | 6/1999 | Sehgal ....................... 370/354 |
| 5,917,900 A | 6/1999 | Allison et al. .............. 379/220 |
| 5,920,562 A | 7/1999 | Christie et al. ............. 370/395 |
| 5,923,659 A | 7/1999 | Curry et al. ................. 370/401 |
| 5,926,482 A | 7/1999 | Christie et al. ............. 370/469 |
| 5,940,598 A | 8/1999 | Strauss et al. ......... 395/200.79 |
| 5,949,871 A | 9/1999 | Kabay et al. ............... 379/229 |
| 5,958,016 A | 9/1999 | Chang et al. ................ 709/229 |
| 5,974,052 A | 10/1999 | Johnson et al. ............. 370/467 |
| 5,991,301 A | 11/1999 | Christie ...................... 370/395 |
| 5,995,608 A | 11/1999 | Detampel, Jr. et al. ..... 379/205 |
| 6,006,098 A | 12/1999 | Rathnasabapathy et al. 455/461 |
| 6,011,780 A | 1/2000 | Vaman et al. ............... 370/237 |
| 6,011,794 A | 1/2000 | Mordowitz et al. ......... 370/389 |
| 6,011,803 A | 1/2000 | Bicknell et al. ............. 370/467 |
| 6,014,379 A | 1/2000 | White et al. ................ 370/389 |
| 6,018,515 A | 1/2000 | Sorber ........................ 370/229 |
| 6,021,126 A | 2/2000 | White et al. ................ 370/352 |
| 6,023,502 A | 2/2000 | Bouanaka et al. .......... 379/115 |
| 6,026,091 A | 2/2000 | Christie et al. ............. 370/395 |
| 6,047,005 A | 4/2000 | Sherman et al. ............ 370/522 |
| 6,064,653 A | 5/2000 | Farris ......................... 370/237 |
| 6,067,546 A | 5/2000 | Lund ............................ 707/10 |
| 6,069,890 A | 5/2000 | White et al. ................ 370/352 |
| 6,075,783 A | 6/2000 | Voit ............................ 370/352 |
| 6,078,582 A | 6/2000 | Curry et al. ................. 370/356 |
| 6,079,036 A | 6/2000 | Moharram ................... 714/712 |
| 6,084,892 A | 7/2000 | Benash et al. .............. 370/701 |
| 6,084,956 A | 7/2000 | Turner et al. ............... 379/230 |
| 6,094,437 A | 7/2000 | Loehndorf, Jr. et al. .... 370/420 |
| 6,097,719 A | 8/2000 | Benash et al. .............. 370/352 |
| 6,097,805 A | 8/2000 | Figurski et al. ............. 379/230 |
| 6,111,893 A | 8/2000 | Volftsun et al. ............ 370/466 |
| 6,112,090 A | 8/2000 | Valentine .................... 455/445 |
| 6,115,380 A | 9/2000 | Bell et al. ................... 370/400 |
| 6,118,779 A | 9/2000 | Madonna .................... 370/353 |
| 6,118,780 A | 9/2000 | Dunn et al. ................. 370/355 |
| 6,119,160 A | 9/2000 | Zhang et al. ............... 709/224 |
| 6,122,255 A | 9/2000 | Bartholomew et al. ..... 370/237 |
| 6,122,263 A | 9/2000 | Dahlin et al. ............... 370/329 |
| 6,122,365 A | 9/2000 | Yegoshin .................... 379/266 |
| 6,125,111 A | 9/2000 | Snow et al. ................. 370/360 |
| 6,125,177 A | 9/2000 | Whittaker ................... 379/243 |
| H1880 H | 10/2000 | Vines et al. |
| H1896 H | 10/2000 | Hoffpauir et al. |
| 6,128,379 A | 10/2000 | Smyk ......................... 379/230 |
| 6,134,235 A | 10/2000 | Goldman et al. ........... 370/352 |
| 6,134,246 A | 10/2000 | Cai et al. .................... 370/474 |
| 6,137,869 A | 10/2000 | Voit et al. ................... 379/114 |
| 6,137,874 A | 10/2000 | Brown et al. ............... 379/220 |
| 6,144,667 A | 11/2000 | Doshi et al. ................ 370/401 |
| 6,144,670 A | 11/2000 | Sponaugle et al. ......... 370/401 |
| 6,151,390 A | 11/2000 | Volftsun et al. ............ 379/229 |
| 6,154,467 A | 11/2000 | Hager et al. ................ 370/467 |
| 6,157,710 A | 12/2000 | Figurski et al. ............. 379/230 |
| 6,178,181 B1 | 1/2001 | Glitho |
| 6,195,425 B1 | 2/2001 | Farris ......................... 379/230 |
| 6,201,804 B1 | 3/2001 | Kikinis ....................... 370/352 |
| 6,215,783 B1 | 4/2001 | Neyman ..................... 370/353 |
| 6,236,722 B1 | 5/2001 | Gilbert et al. .............. 379/230 |
| 6,324,183 B1 | 11/2001 | Miller et al. ................ 370/467 |
| 6,327,267 B1 * | 12/2001 | Valentine et al. ........... 370/466 |
| 6,330,614 B1 * | 12/2001 | Aggarwal et al. .......... 370/471 |
| 6,333,931 B1 | 12/2001 | LaPier et al. |
| 6,366,655 B1 | 4/2002 | Book et al. ............ 379/114.28 |
| 6,411,632 B2 | 6/2002 | Lindgren et al. |
| 6,430,189 B1 | 8/2002 | Juntumaa et al. |
| 6,487,286 B1 * | 11/2002 | Reaves et al. ........... 379/221.1 |
| 6,507,649 B1 | 1/2003 | Tovander |
| 6,515,985 B2 * | 2/2003 | Shmulevich et al. ....... 370/356 |
| 6,563,835 B1 | 5/2003 | Chen |
| 6,584,190 B1 | 6/2003 | Bressler |
| 6,594,258 B1 | 7/2003 | Larson et al. |
| 6,611,532 B1 * | 8/2003 | Madour et al. ............. 370/466 |
| 6,611,533 B1 | 8/2003 | Liao et al. |
| 6,674,748 B1 | 1/2004 | Dykhuizen et al. |
| 6,678,242 B1 | 1/2004 | Simon |
| 2002/0048360 A1 | 4/2002 | Zambre et al. |
| 2002/0105969 A1 * | 8/2002 | Benedyk et al. ............ 370/466 |

FOREIGN PATENT DOCUMENTS

| | | | |
|---|---|---|---|
| EP | 1054568 A2 * | 11/2000 | ............ H04Q/3/00 |
| WO | WO 97/11563 A2 | 3/1997 | |
| WO | WO 98/28885 A1 | 7/1998 | |
| WO | WO 00/19758 A2 | 4/2000 | |
| WO | WO 00/22840 A2 | 4/2000 | |
| WO | WO 00/30369 A1 | 5/2000 | |
| WO | WO 00/31933 A1 | 6/2000 | |
| WO | WO 00/33519 A1 | 6/2000 | |
| WO | WO 00/56032 A1 | 9/2000 | |
| WO | WO 01/37532 | 5/2001 | |

OTHER PUBLICATIONS

Fitchard, "A New Voice in the Boardroom," WIreless Review, pp. 1–3 (Sep. 1, 2003).

"Fixed Wireless Technology," ISP Planet, pp. 1–4 (May 14, 2002).

Martinek, "Office on the Fly," Wireless Review, pp. 1–4 (Jul. 15, 2001).

"March Networks 3300 Integrated Communications Platform," Mitel Networks Corporation, pp. 1–34 (Jul. 2001).

Swartz, "Ready, Set, Wireless Office?," Wireless Review, pp. 1–4 (Jun. 1, 2000).

"Telestra and Ericsson Trial Next Generation Wireless Office Solution," Ericsson, pp. 1–2 (Apr. 28, 2000)

"Mitel and Ericsson Join Forces to Deliver an Integrated Digital Wireless Office Solution with PBX Functionality-Company Business and Marketing," Cambridge Telcom Report, pp. 1–4 (Apr. 24, 2000).

"Market and Development Agreement Targets Customers Looking for Ways to Become More Productive Through Convenient and Cost–Effective Communication," Ericsson Press Release, pp. 1–2 (Apr. 4, 2000).

Sulkin, "Emerging Options for Wireless PBXs," Voice2000, pp. 1–8 (Feb. 2000).

Drzewianowksi, "WLANs—For the Picking," Communications Solutions™ Next–Gen Networks, pp. 1–9 (Jan. 2000).

"The Wireless Business Connection," Second Quarter 2000 Report, The Phillips Group—Infotech, pp. 1–9 (2000).

"Corporate Offices to Go Wireless First Australian GSM on the Net Trial," Ericsson Press Release, pp. 1–3 (Aug. 11, 1999).

"Ericsson Solution Chosen for World'First Combined DECT/GSM Communications Service," Ericsson, pp. 1–9 (Jun. 21, 1999).

"Enterprise IP Gateway," Ericsson, pp. 1–6 (1999).

"The Ericsson IPT System," Ericsson, pp. 1–8 (1999).

"Wireless: Top Ericsson Executives Lay Out Corporate Vision, Unveil Strategy for the Enterprise Customer—Company Business and Marketing," EDGE, On & About AT&T, pp. 1–5 (Nov. 30, 1998).

"Ericsson Wireless Office Services to Provide Digital System Through AT&T Wireless Services," Ericsson Press Release, pp. 1–2 (Apr. 17, 1998).

Woods, "Fresno Bee Still Buzzing About Wireless," Tech-News, pp. 1–2 (1995).

"teleSys Announces the Compatibility of Ericsson's Mobile Advantage Wireless Office and teleSys'MACH7–IP Gateway," teleSys Software—Press Release, pp. 1–2 (Publication Date Unknown).

Official Action in U.S. Appl. No. 09/559,767 (Feb. 26, 2004).

"Ericsson Announces General Availability of Its Mobile Advantage Wireless Office System," Ericsson Press Release, pp. 1–2 (Nov. 4, 1999).

Johanson et al., "Mobile Advantage Wireless Office—A Digital Wireless Office System for TDMA/136 Networks," Ericsson Review No. 1, pp. 20–27 (1999).

Michael McGrew, "Transport SS7 Signaling Over IP," Lucent Technologies Inc., p. 1–8, (Nov. 1998).

U.S. Appl. No. 09/537,835, filed Mar. 29, 2000, Paul A. Miller et al.

U.S. Appl. No. 09/541,853, filed Apr. 5, 2000, Paul A. Miller et al.

U.S. Appl. No. 09/543,135, filed Apr. 5, 2000, Paul A. Miller et al.

U.S. Appl. No. 09/559,767, filed Apr. 27, 2000, Paul A. Miller et al.

U.S. Appl. No. 09/588,852, filed Jun. 6, 2000, Robby D. Benedyk et al.

U.S. Appl. No. 09/618,807, filed Jul. 18, 2000, Robert John Tinsley et al.

U.S. Appl. No. 09/735,142, filed Dec. 12, 2000, Robby D. Benedyk et al.

U.S. Appl. No. 09/770,316, filed Jan. 26, 2001, Dan A. Brendes et al.

U.S. Appl. No. 09/839,394, filed Apr. 20, 2001, Robby D. Benedyk et al.

O'Shea, "Mating Season," Telephony, p. 10–11, (Sep. 20, 1999).

Hamdi et al., "Voice Service Interworking for PSTN and IP Networks," IEEE Communications Magazine, p. 104–111, (May 1999).

Lakshmi–Ratan, "The Lucent Technologies Softswitch–Realizing the Promise of Convergence," Bell Labs Technical Journal, p. 174–195, (Apr.–Jun. 1999).

Tekelec, "Eagle® Feature Guide," Publication P/N 910–1225–01, Revision B, (Jan. 1998).

O'Shea, "The Network That's Never Done," Telephony, p. 38, 40, 42, 43, (Sep. 15, 1997).

Tekelec, "Eagle STP: Database Transport Access Feature," Publication 908–0136–01, (1997).

Tekelec, "SS7–Frame Relay Access Device: SS7 Protocol Information Translator," Publication 908–0167–01, (1997).

Tekelec, "Eagle STP: ANSI–ITU Gateway Feature," Publication 908–0133–01, (1997).

Tekelec, "Eagle STP: X.25 to SS7/IS.41 Protocol Conversion Feature," Publication 908–0135–01, (1997).

Tekelec, "STP–LAN Interface Feature," Publication 980–0134–01, (1997).

Tekelec, "Eagle STP: Platform," Publication 908–0126–01, (1997).

Snyder, "Rerouting Internet Traffic Jams," Telephony, p. 12, (Nov. 11, 1996).

Snyder, "Branded With Optics," Telephony, p. 49–50, (Jul. 22, 1996).

Anonymous, "Around the Loop," Telephony, p. 26, (Jul. 22, 1996).

Zaharychuk et al., "Gateway Signal Transfer Points: Design, Services and Benefits," IEEE, p. 0233–0240, (1990).

Bootman et al., "Generic Building Blocks for the Telecommunications Management Network," IEEE, p. 0163–0167, (1988).

Bootman et al., "Intelligent Network Services Using a Service Switching Node," IEEE, p. 1332–1335, (1988).

Buckles, "Very High Capacity Signaling Transfer Point for Intelligent Network Services," IEEE, p. 1308–1311, (1988).

* cited by examiner

DISTRIBUTED SIGNALING SYSTEM 7 (SS7) MESSAGE ROUTING GATEWAY

TECHNICAL FIELD

The present invention relates to an SS7 message routing gateway. More particularly, the present invention relates to a distributed SS7 message routing gateway.

BACKGROUND ART

The conventional telecommunications network includes two distinct communication pathways or subnetworks—a voice network and a signaling network. These two networks function in a cooperative manner to facilitate a call between users. As implied by its name, the voice network handles the transmission of voice (or user data) information between users. The signaling network has a number of responsibilities, which include call setup, call teardown, and database access features. In simple terms, the signaling network facilitates the dynamic linking together of a number of discrete voice-type communication circuits, such that a voice-type connection is established between the calling and called party. These functions are generically referred to as call setup and call teardown. Additionally, the signaling network provides a framework through which non-voice related information may be transported, with this data and transport functionality being transparent to the users. This signaling technique is often referred to as out-of-band signaling, where the term "band" implies voice band. Common examples of services provided via the signaling network include 800 number database services, calling card verification services, and caller ID services. The original motivation for employing such an out-of-band signaling technique was to provide telecommunications service agents with an infrastructure that allowed for new and enhanced revenue producing services, such as 800 database access, call waiting, and caller ID services and to avoid tying up expensive voice trunks with signaling traffic.

From a hardware perspective, an SS7 network includes a plurality of SS7 nodes, generically referred to as signaling points (SPs), that are interconnected using signaling links, also referred to as SS7 links. At least three types of SPs are provided in an SS7 network: service switching points (SSPs), signal transfer points (STPs) and service control points (SCPs).

An SSP is normally installed in Class 4 tandem or Class 5 end offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed as mated pairs. Finally, SCPs control access to databases such as 800 number translation, 800 number carrier identification, credit card verification, etc. SCPs are also deployed in pairs.

Signaling links are transmission facilities used to connect SPs together. Conventional signaling links are dedicated bidirectional facilities operating at 56 kbps in the U.S. and Canada and at 64 kbps when clear channel capability is deployed. Normally, every link has a mate for redundancy and enhanced network integrity.

In order to ensure consistent and reliable communication across the signaling network infrastructure, a common or standard digital signaling protocol was established by the ITU-TS in the mid-'60s, and this protocol was known as Signaling System 6. By the mid-'80s the protocol had evolved into a slightly more sophisticated system known as Signaling System 7 (SS7). As a protocol, SS7 defines the hierarchy or structure of the information contained within a message or data packet. This internal data structure is often referred to as the protocol stack, which is comprised of a number of well defined strata or layers. In general terms, the SS7 protocol stack consists of 4 levels or layers:

(1) the physical layer
(2) the data link layer
(3) the network layer
(4) the user and application part layer The physical layer is the lowest or most fundamental layer and is the first layer that is used to interpret and process and incoming message. This layer is concerned with determining and/or providing the electrical characteristics needed to transmit the digital data over the interface being used. Following interpretation/processing, the incoming message is passed up the stack to the data link layer.

The data link layer (MTP layer 2) resides adjacent and above the physical layer and is responsible for providing the SS7 network with error detection/correction and properly sequenced delivery of all SS7 message packets. Following interpretation/processing, the incoming message is passed up the stack to the network layer.

The network layer (MTP layer 3) resides adjacent and above the data link layer and is responsible for message packet routing, message packet discrimination, and message packet distribution. Functionally, message discrimination determines to whom the message packet is addressed. If the message contains the local address (of the receiving node), then the message is passed on to message distribution. If the message is not addressed to the local node, then it is passed on to the message router. Following interpretation/processing, the incoming message is passed up the stack to the user part layer only if the message was destined to that node.

The user and application part layer resides adjacent and above the network layer and actually consists of several distinct parts. The parts may include mobile application part (MAP), radio access network application part (RANAP), transaction capabilities application part (TCAP), ISDN user part (ISUP), telephone user part (TUP), and broadband ISDN user part (B-ISUP).

While the SS7 network has functioned successfully for a number of years, such a network typically includes centralized nodes that make routing decisions which can have some disadvantages. Such disadvantages include expense due to processing requirements of centralized nodes, high-traffic volume at the centralized nodes, and possible network outage if one or more of the centralized nodes fails.

FIG. 1 is a block diagram of a conventional SS7 network in which a centralized node makes routing decisions. In FIG. 1, SSPs 100 and 102 communicate with SCPs 104 and 106 through a mated pair of STPs 108 and 110. STPs 108 and 110 are located at a central point in the network and receive traffic from many SSPs and SCPs. STPs 108 and 110 make routing decisions for SS7 messages and route the messages to their intended destinations. STPs 108 and 110 may also translate the protocol of incoming SS7 messages if the destination node is of a different protocol than the sending node.

Because of the central location of STPs 108 and 110 and because of all of the tasks required to be performed by STPs 108 and 110, STPs 108 and 110 include an extremely complex parallel architecture for handling all of these functions. An example of such an STP with a highly parallel architecture is the EAGLE® STP available from Tekelec of Calabasas, Calif.

FIG. 2 is a block diagram of a conventional data network. In the data network, routers 200, 202, 204, and 206 are co-located with end offices 208 and 210 and databases 212 and 214. Routers 200, 202, 204, and 206 are IP routers. Routers 200, 202, 204, and 206 are only capable of making IP routing decisions. Thus, packets incoming from elements 208, 210, 212, and 214 are in IP format and packets outcoming from routers 200, 202, 204, and 206 are also in IP format.

While IP networks provide a number of advantages, IP networks do not include the inherent reliability or stability of a conventional SS7 network. As discussed above, the conventional SS7 network architecture includes centralized routing elements which are expensive, complex, and subject to high-traffic volumes. Thus, there exists a need for a distributed SS7 gateway that avoids at least some of the difficulties associated with the prior art.

DISCLOSURE OF THE INVENTION

According to one aspect, the present invention includes a distributed SS7 gateway. The distributed SS7 gateway includes a plurality of distributed gateway routing elements. Each of the distributed gateway routing elements may be co-located with an SS7 node, such as an SSP or an SCP. Each of the distributed gateway routing elements performs an SS7 routing function, such as an MTP3 routing function. The distributed gateway routing elements route messages to other distributed gateway routing elements or to a translation services node for further processing. Such routing is similar to the internal routing performed by an SS7 STP or signaling gateway. As used herein, the phrase "signaling gateway" refers to a network node capable of routing telephony-related signaling messages between other network nodes and that is also capable of performing protocol translations for the signaling messages. However, because the functional components of the distributed gateway are co-located with network endpoints, rather than centrally located in a single node, the possibility of a complete network outage caused by failure of a single node is reduced.

According to another aspect, the invention may include an operations, administration, and maintenance (OA&M) node. The OA&M node may establish initial DGRE routing tables.

According to yet another aspect, the present invention includes a translation services module. The translation services module may be centrally located to perform centralized functions, such as global title translation, protocol conversion, and number portability.

Accordingly, it is an object of the present invention to provide a distributed message routing gateway that avoids at least some of the difficulties associated with conventional centralized routing nodes and with conventional IP telephony networks.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings.

DETAILED DESCRIPTION OF THE INVENTION

Rather than locating all of the SS7 routing architecture in a centralized network element, such as a signal transfer point or signaling gateway, embodiments of the present invention include a plurality of distributed gateway routing elements that are co-located with other SS7 network elements. The distributed gateway routing elements function collectively as a signal transfer point or signaling gateway. However, because the distributed gateway routing elements are not located together in a single location, the processing load on each element is reduced and the possibility of a complete network failure is reduced.

Figure 1:
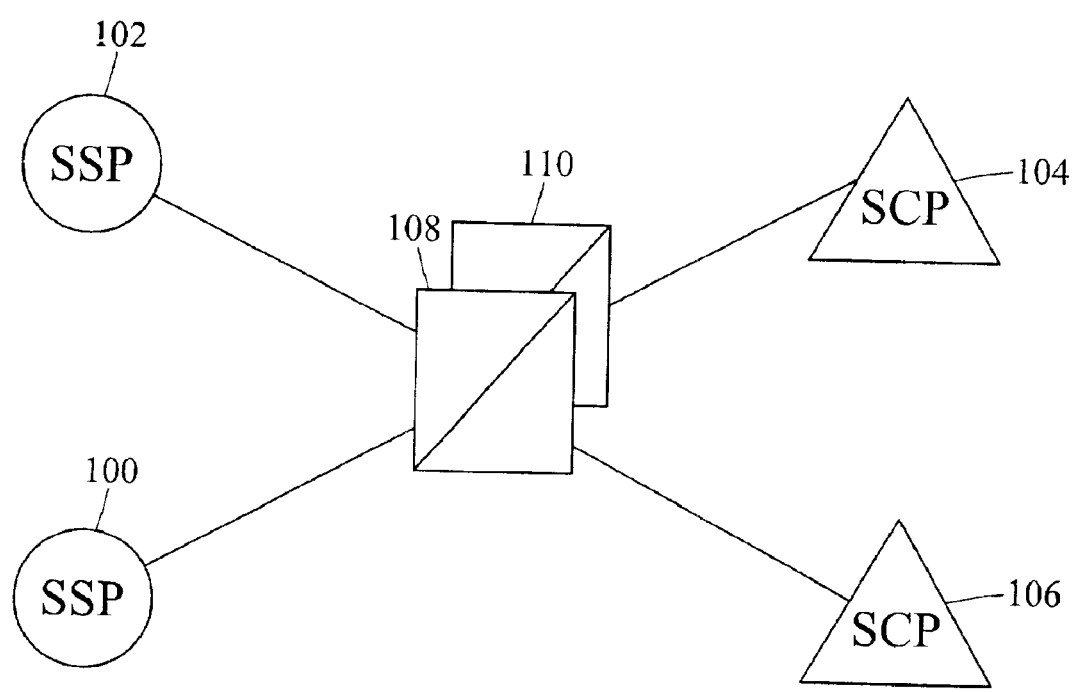
FIG. 1 is a block diagram of a conventional SS7 network having a centralized routing element.
Figure 2:
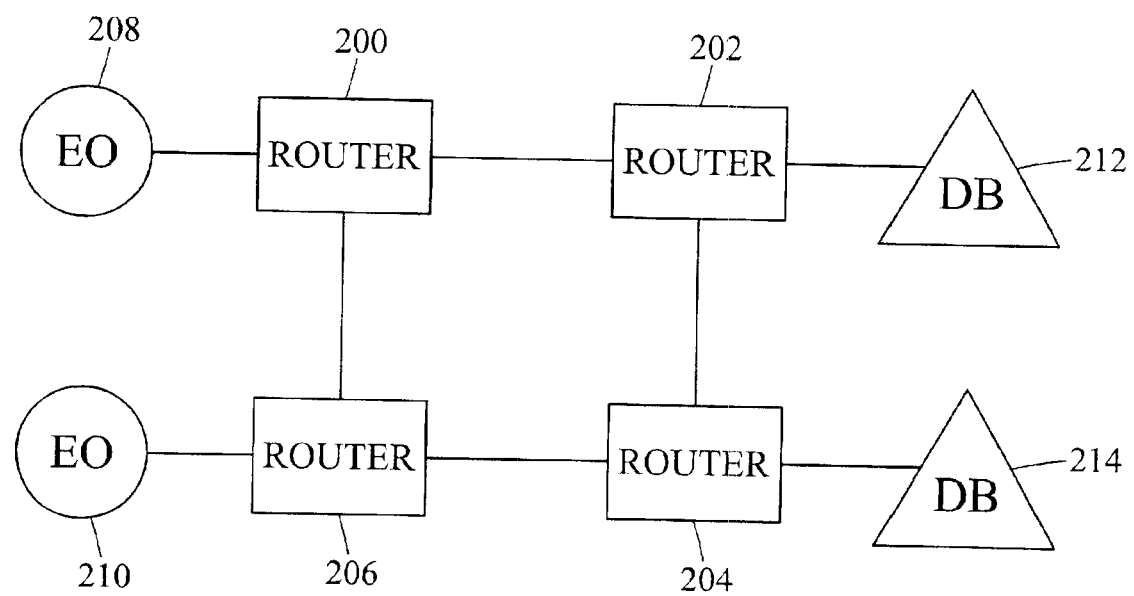
FIG. 2 is a block diagram of a conventional data network.
Figure 3:
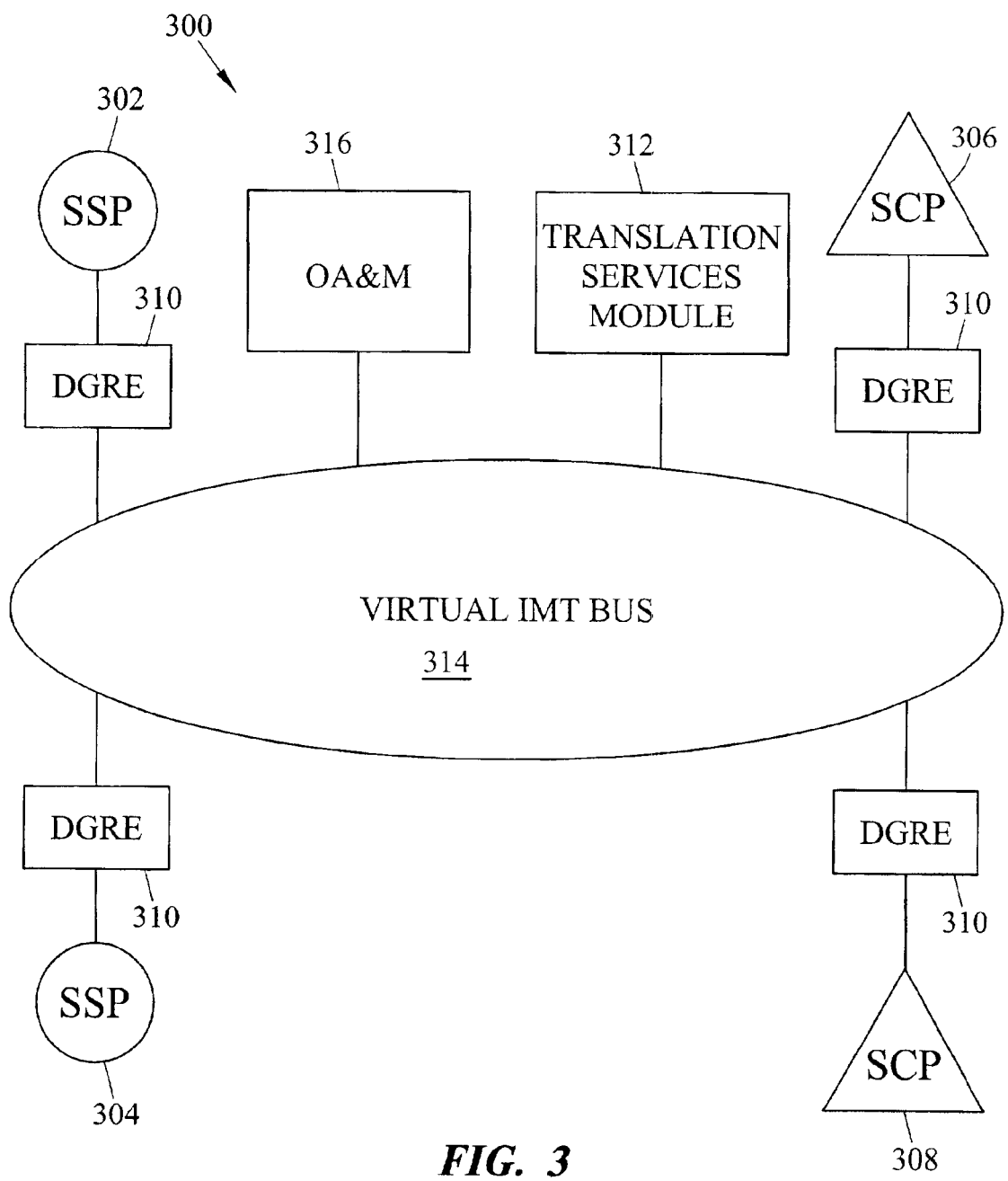
FIG. 3 is a block diagram of a network including a distributed message routing gateway according to an embodiment of the present invention.

FIG. 3 is a block diagram of a communications network including a distributed gateway according to an embodiment of the present invention. Referring to FIG. 3, network 300 includes conventional SS7 network elements, such as SSPs 302 and 304 and SCPs or application servers 306 and 308. However, unlike a conventional SS7 network, network 300 does not include a conventional centralized signal transfer point or signaling gateway. In order to perform the functions provided by a conventional signal transfer point or signaling gateway, network 300 includes a plurality of distributed gateway routing elements 310 that are co-located with SS7 signaling points 302, 304, 306, and 308. Each of the distributed gateway routing elements 310 is capable of sending and receiving SS7 messages via an SS7 link that connects each distributed gateway routing element to its respective SS7 network element. In addition, each distributed gateway routing element 310 communicates with other distributed gateway routing elements and with central distributed gateway routing element 312 via virtual interprocessor message transport (IMT) bus 314.

Although in the illustrated embodiment each DGRE 310 is connected to a single SS7 signaling point, the present invention is not limited to such an embodiment. For example, in an alternative embodiment of the present invention, each DGRE 310 may be associated with more than one SS7 network element. In addition, DGREs 310 may be connected to network elements other than those illustrated in FIG. 3, such as soft switches and media gateway controllers.

Virtual IMT bus 314 performs functions similar to a conventional interprocessor message transfer bus present in an SS7 signal transfer point, such as the EAGLE® STP available from Tekelec. Such functions include reliable delivery of SS7 messages to modules for outbound processing, meeting SS7 message timing requirements, and carrying network management messages, such as routing table establishment and maintenance-related messages between distributed gateway routing elements. However, unlike the conventional IMT bus, virtual IMT bus 314 spans large geographic distances, thus making meeting the SS7 reliability and timing requirements difficult. In order to meet these requirements, it is envisioned that a protocol that guarantees quality of service for each connection may be used. An example of such a protocol may be Internet Protocol version 6 (IPv6).

In IPv6, a new field, referred to as a flow label, is provided in the IPv6 packet header and may be used by distributed gateway routing elements and IP routers that interconnect distributed gateway routing elements to provide quality of service for call signaling messages traveling between distributed gateway routing elements. For call signaling packets, end-to-end delay may be one of the quality of service parameters that is guaranteed. Another quality of service parameter important in transmitting SS7 message packets via virtual IMT bus 314 may be reliability. Both of these parameters may be set for call signaling packets transmitted between distributed gateway routing elements using the flow label in the IPv6 packet header.

More particularly, distributed gateway routing elements 310 may encapsulate SS7 call signaling messages in IP datagrams and set one or more quality of service parameters in the datagrams to notify IP routers that interconnect distributed gateway routing elements 310 of the quality of service expected for these packets. The manner in which IP routers treat such packets depends on the routing algorithm used and is beyond the scope of this disclosure. What is important for purposes of the present invention is that the distributed gateway routing elements set quality of service parameters in the call signaling packets to be transmitted over virtual IMT bus 314 so that the interconnecting IP routers can give such packets the appropriate priority.

Figure 4A:
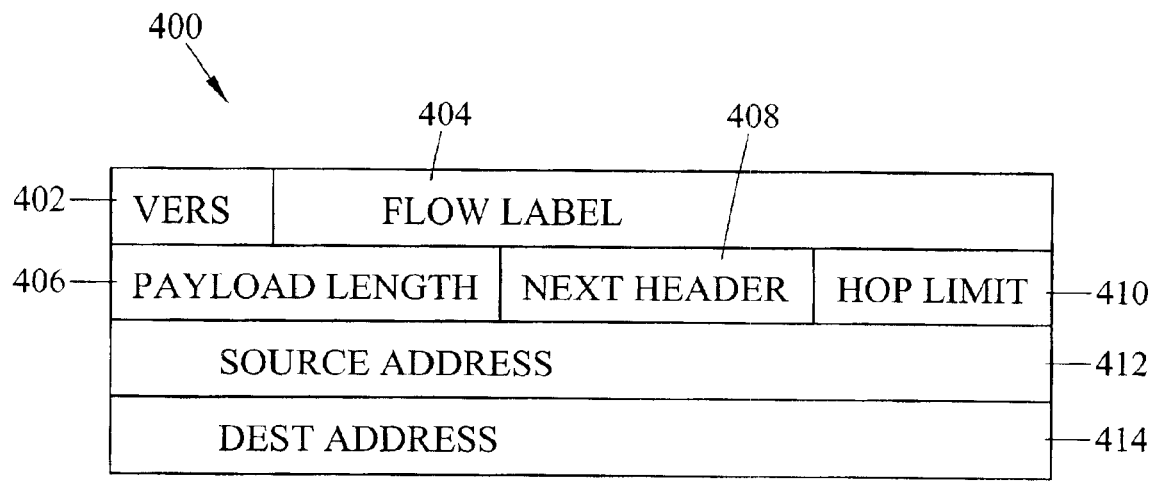
FIG. 4(A) is a block diagram illustrating IPv6 header fields including the flow label field that may be used to provide quality of service for call signaling messages routed between distributed gateway routing elements according to embodiments of the present invention.
Figure 4B:
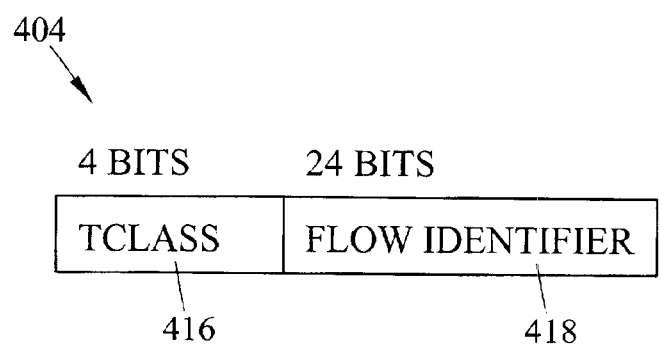
FIG. 4(B) is a block diagram of sub-field of the flow label field illustrated in FIG. 4(A)

FIGS. 4(A) and 4(B) respectively illustrate examples of an IPv6 header and a flow label field of the IPv6 header. In FIG. 4(A), IPv6 header 400 includes version field 402 indicates the IP version. Flow label field 404 contains parameters used by routers to provide quality of service. Payload length field 406 specifies the length of the IPv6 payload. Next header field 408 specifies the type of any extension headers that follow the base header. Extension headers are optional in IPv6 and are not of importance to explaining the present invention. Hop limit field 410 provides a strict bound on the maximum number of hops a datagram can make before being discarded. Source address field 412 and destination field 414 each contain 128-bit IP addresses, thus greatly increasing the IP address space over conventional IPv4.

Referring to FIG. 4(B), flow label field 404 is divided into a T-class field 416 and a flow identifier field 418. T-class field 416 specifies the traffic class for the datagram. In the illustrated embodiment, T-class field 416 is a 4-bit field. Values 0–7 of T-class field 416 are used to specify the time sensitivity of flow-controlled traffic. Values 8–15 are used to specify a priority for non-flow-controlled traffic. The remaining 24-bit flow identifier field contains a source-chosen flow identifier for a given traffic stream. Thus, in order to guarantee quality of service for packets routed between distributed gateway routing elements, a source distributed gateway routing element may select a flow identifier for SS7 signaling message traffic and assign a traffic class value indicating high time sensitivity. Using these parameters, a source distributed gateway routing element may forward the SS7 signaling message to another distributed gateway routing element. The receiving distributed gateway routing element may send a response back to the sending distributed gateway routing element using the same flow identifier and T-class. Routers in between the two distributed gateway routing elements may utilize the T-class and flow identifier values to ensure that packets are delivered between the distributed gateway routing elements within a predetermined time period.

Figure 5:
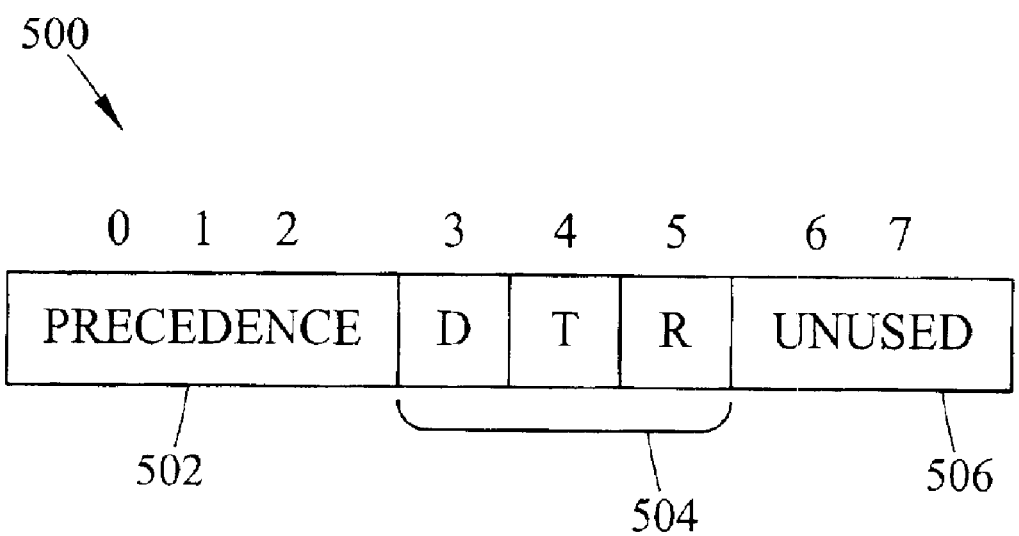
FIG. 5 is a block diagram of a type of service field from an IPv6 header that may be used to provide quality of service for call signaling messages routed between distributed gateway routing elements according to an embodiment of the present invention.

The present invention is not limited to using flow identifier field in an IPv6 header to provide quality of service for SS7 messages traveling between distributed gateway routing elements. For example, in an alternative embodiment, the type of service (TOS) field in the IPv4 header may be used to provide quality of service between distributed gateway routing elements. FIG. 5 illustrates an example of the type of service field in the IPv4 header. In FIG. 5, type of service field 500 includes a precedence field 502, transport type bits 504, and unused portion 506. Precedence field 502 is used to specify the precedence of the datagram. D, T and R bits are used to specify delay, throughput, and reliable transport, respectively. For example, if the D bit is set, the datagram is requesting low delay transport. If the T bit is set, the datagram is requesting high throughput. If the R bit is set, the datagram is requesting high reliability. By specifying combinations of precedence and transport bits, distributed gateway routing elements may request a specified quality of service for SS7 call signaling messages routed between distributed gateway routing elements. For example, a distributed gateway routing element may set a precedence value in precedence field 502 indicating high priority and set the delay bit to ensure that a datagram is delivered on time. Routers between the distributed gateway routing elements may use the TOS field to prioritize SS7 message packets and guarantee one or more QoS parameters, such as delay or reliability.

Another example of a mechanism for providing quality of service for call signaling packets transmitted between distributed gateway routing elements is to use multi-protocol label switching (MPLS). MPLS is used by routers to switch rather than route packets. Switching is faster than routing because it is a layer 2, rather than a layer 3 function of the IP protocol stack. When an incoming packet includes an MPLS header, the receiving router switches the packet based on the label in the MPLS header, rather than routing the packet based on its IP address. The router also changes the label in the MPLS header to a new label, which the next router uses to switch the packet to the appropriate outgoing link. Unlike conventional IP routing, MPLS routes are established in advance before any data is transferred. Since routes are established in advance, MPLS can be used to establish forwarding equivalence classes whereby classes of IP packets are guaranteed the same quality of service.

Forwarding equivalence classes can be used to guarantee special treatment of MPLS-encapsulated SS7 packets transmitted between distributed gateway routing elements according to embodiments of the present invention. For example, distributed gateway routing elements 310 may add MPLS labels to outgoing IP-encapsulated SS7 call signaling message packets. The MPLS label added by the distributed gateway routing element determines the forwarding equivalence class for the SS7 signaling message packets at the time of network ingress. Routers that interconnect the distributed gateway routing elements examine only the MPLS label to determine the outgoing link for the MPLS-encapsulated SS7 message. The label-switched path between distributed gateway routing elements may be agreed upon in advance of transmission to determine the quality of service for SS7 signaling message packets.

Figure 6A:
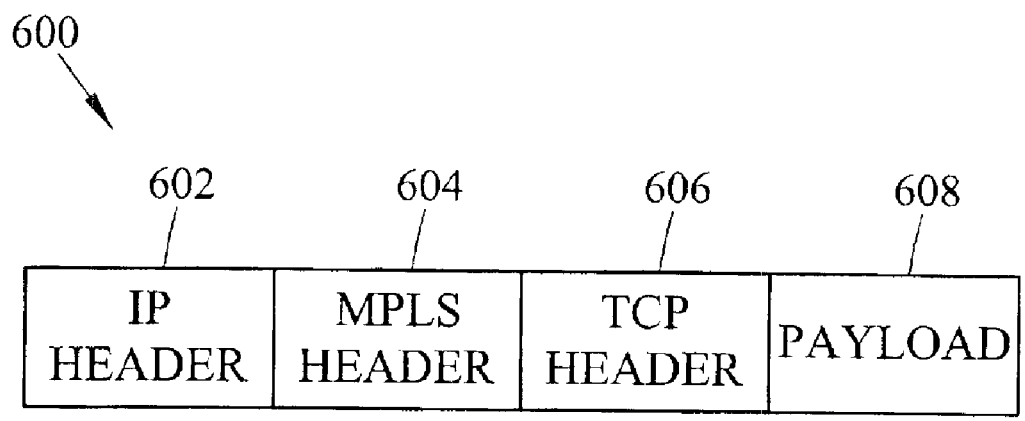
FIG. 6(A) is a block diagram of an IP packet including an MPLS header that may be used to provide quality of service for call signaling messages routed between distributed gateway routing elements according to an embodiment of the present invention.

FIG. 6(A) illustrates an example of an IP packet including an MPLS header. In the illustrated example, IP packet 600 includes an IP header 602, an MPLS header 604, a TCP header 606, and a payload 608. For an SS7 call signaling message routed between distributed gateway routing elements, IP header 602 may contain the IP address of one of the distributed gateway routing elements. MPLS header 604 may contain a service class identifier that identifies a class of service to be given to IP packet 600. For SS7 call signaling messages, the class of service is preferably a high class of service that has low delay and high reliability. TCP header 606 contains transport layer information such as sequence numbers for a TCP stream that may be established between distributed gateway routing elements. Finally, payload field 608 contains some or all of the SS7 call signaling packet. Thus, a variety of methods may be used to guarantee quality of service for call signaling packets routed between distributed gateway routing elements.

Figure 6B:
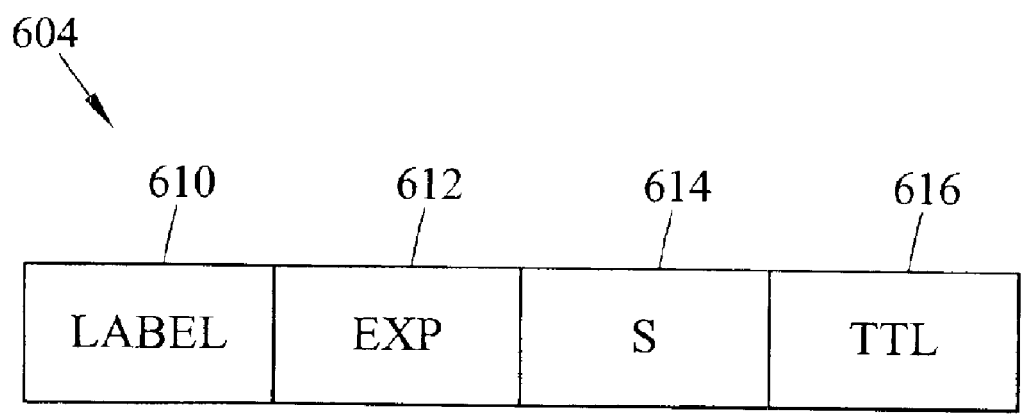
FIG. 6(B) is a block diagram of fields in an MPLS header that may be used by distributed gateway routing elements to provide quality of service for SS7 messages routed between distributed gateway routing elements according to an embodiment of the present invention.

FIG. 6(B) is a block diagram of the fields of MPLS header 604 illustrated in FIG. 6(A). In FIG. 6(B), MPLS header 604 includes a label field 610, an experimental use field 612, a bottom of stack bit 614, and a time to live field 616. As discussed above, label field 610 contains the MPLS label that is assigned by the ingress router, i.e., the distributed gateway routing element, to determine the path forwarding equivalence class of the packet. Distributed gateway routing elements 310 may initialize experimental use field 614 to a value that indicates a quality of service to be given to packets within a forwarding equivalence class. Bottom of stack field and time to live field are not of importance in explaining the present invention. Further details of the multi-protocol labels switching architecture can be found in Internet Engineering Task Force (IETF) Internet draft: *Multi-Protocol Label Switching Architecture*, draft-ietf-mpls-arch-07.txt, July 2000, the disclosure of which is incorporated herein by reference in its entirety.

Referring back to FIG. 3, translation services module 312 provides translation services to distributed gateway routing elements 310, such as protocol translation, number portability, directory number to IP address mapping, and global title translation. Translation service module 312 may be a single node dedicated to providing more than one of the above-enumerated translation services. Alternatively, translation services module 312 may be a single node dedicated to performing one of the above-enumerated translation services. In the single-service case, a plurality of translation services modules 312 may be coupled to virtual IMT bus 314 for performing the various translation services. In both the single and multiple-service cases, redundant translation services modules 312 may be provided for load sharing and reliability. Finally, OA&M module 316 performs administrative functions for the distributed gateway routing elements, such as database provisioning.

DGRE Architecture

Figure 7:
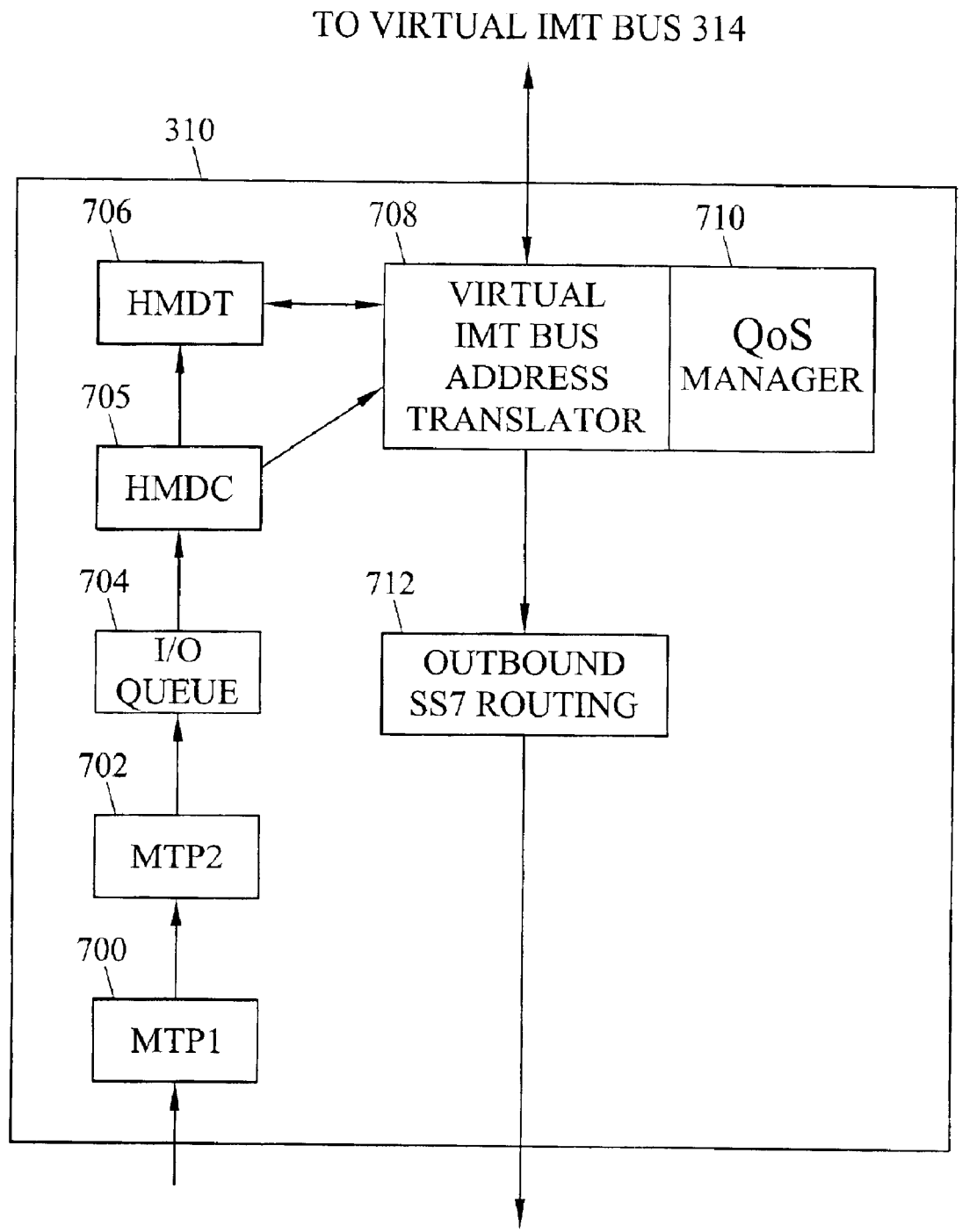
FIG. 7 is a block diagram illustrating an exemplary internal architecture of a distributed gateway routing element according to an embodiment of the present invention.

FIG. 7 is a block diagram of an exemplary internal architecture for a distributed gateway routing element according to an embodiment of the present invention. In FIG. 7, distributed gateway routing element includes processes for implementing an SS7 protocol stack and processes for communicating via virtual IMT bus 314. From a hardware perspective, each DGRE 310 may be a general or special purpose computer having at least one SS7 interface and at least one interface to virtual IMT bus 314. With regard to SS7 processing, each distributed gateway routing element 310 includes MTP level 1 and 2 processes 700 and 702 for performing SS7 MTP layer 1 and 2 functions, such as sequencing and error correction. Input/output queue 704 buffers messages before processing by higher level functions. Message handling and discrimination (HMDC) process 705 determines whether a message is addressed to this distributed gateway 300 (illustrated in FIG. 3) or to another distributed gateway. This determination may be made based on the destination point code and/or other fields, such as the circuit identification code (CIC), in a received SS7 message. Message handling and distribution (HMDT) process 706 routes messages that are destined for this distributed gateway 300 to an element of this distributed gateway, such as translation services module 310, for further processing.

HMDT process 706 functions similarly to the HMDT process in the above-referenced EAGLE® STP. However, unlike the HMDT process in the conventional EAGLE® STP which distributes messages internally in the STP, HMDT process 706 distributes messages to DGREs that are part of the same distributed gateway via virtual IMT bus 314 which may span a large geographic area. Thus, in FIG. 3, it is envisioned that DGREs 310 may share a single SS7 point code. A message received by any one of DGREs 310 via one of the SS7 signaling links that is addressed to the point code distributed gateway 300 may be internally routed to one of the other DGREs via virtual IMT bus 314. Thus, DGREs 310 function collectively as a signal transfer point without the requirement of a centralized node.

Gateway Screening

Additional functions that may be performed by distributed gateway routing elements 310 include gateway screening, message copying, and overriding DPC routing. Gateway screening is a function performed by DGREs 310 to screen messages based on one or more parameters in the messages. For example, DGREs 310 may each include a gateway screening process that screens incoming SS7 messages based on parameters, such as originating point code, destination point code, and/or CIC code. In one screening example, if a message is from an allowed originating point code, distributed gateway routing elements 310 may allow the message into the network comprising virtual IMT bus 314. If a message is not from an allowed originating point code, the message may be discarded.

Message Copying

Message copying refers to copying all or portions of selected message signal units (MSUs) received by a DGRE.

For example, it may be desirable to capture all MSUs directed to a database, such as SCP 306 for accounting or billing purposes. For network monitoring purposes, it may be desirable to record copies of or a count of MSUs received by DGREs 310. The copies MSU information received by DGREs 310 may be forwarded to an external node for further processing. Such forwarding may be accomplished by sending the message copies in Internet protocol packets to the external node via a wide or local area network.

Overriding Point Code Routing

Overriding point code routing is another function that may be performed by DGREs 310. For example, as mentioned above, DGREs may route messages to other DGREs based on the destination point code, CIC code, or other parameters in received SS7 MSUs. This is the normal DPC routing function. In addition to this type of routing, DGREs 310 may also override normal DPC routing based on the presence of one or more parameters in a message. One example in which it may be desirable to override normal DPC routing is when providing triggerless number portability service. According to triggered number portability service, an SSP, such as SSP 304, may receive a call to a ported number. In such a situation, SSP 304 would formulate a transaction capabilities application part (TCAP) query to a number portability database, such as SCP 306. The query would be routed to SCP 306 via DGREs 310. The response to the query containing the real directory number corresponding to the ported number is sent from SCP 306 to SSP 304 via DGREs 310. SSP 304 uses the real directory number in the response to set up a call with the called party by formulating an ISDN user part (ISUP) message addressed to the called party end office and containing the subscriber's real directory number.

According to triggerless number portability, when SSP 304 receives a call to a ported number, SSP 304 sends an ISUP message to the destination SSP associated with the dialed directory number via distributed gateway 300. One of the distributed gateway routing elements 310 receives the message, and determines that the message is related to a call to a subscriber whose number has been ported to another service area. In response to determining that the number has been ported, the receiving DGRE 310 forwards the message to translation services module 310, which translates the DPC in the message to the DPC of the SSP servicing the subscriber's new service area, inserts the new directory number in the message, and forwards the message to the appropriate destination SSP. Thus, DGREs 310 according to embodiments of the present invention are capable of performing both triggered and triggerless number portability routing operations.

Virtual IMT Bus Communications Processes

In order to communicate with other distributed gateway routing elements via virtual IMT bus 314, distributed gateway routing element includes virtual IMT bus address translator 708 and quality of service manager 710. Virtual IMT bus address translator 708 may translate between SS7 and the protocol used on virtual IMT bus 314. As stated above, exemplary protocols that may be used on virtual IMT bus 314 include IP version 6 including flow labels, IP version 4 including the type of service field, and MPLS. Thus, virtual IMT bus address translator is preferably capable of formulating the appropriate header including the quality of service parameters and forwarding the packets to other distributed gateway routing elements via IMT bus 314.

Quality of service manager 710 may determine the quality of service required for a given SS7 packet and instruct virtual IMT bus address translator 708 to set the appropriate parameters in the IP and/or MPLS headers. For example, if the packet is an ISUP call signaling packet, quality of service manager 710 may instruct virtual IMT bus address translator 708 to assign a high priority to the packet, using one or more of the above-described parameters, with regard to end-to-end delay.

Virtual IMT bus address translator 708 preferably also receives messages from virtual IMT bus 314, translates the messages from the virtual IMT bus protocol to SS7, and passes the messages to outbound SS7 routing process 712. Outbound SS7 routing process 712 selects the outgoing SS7 link based on the SS7 point code.

Figure 8:
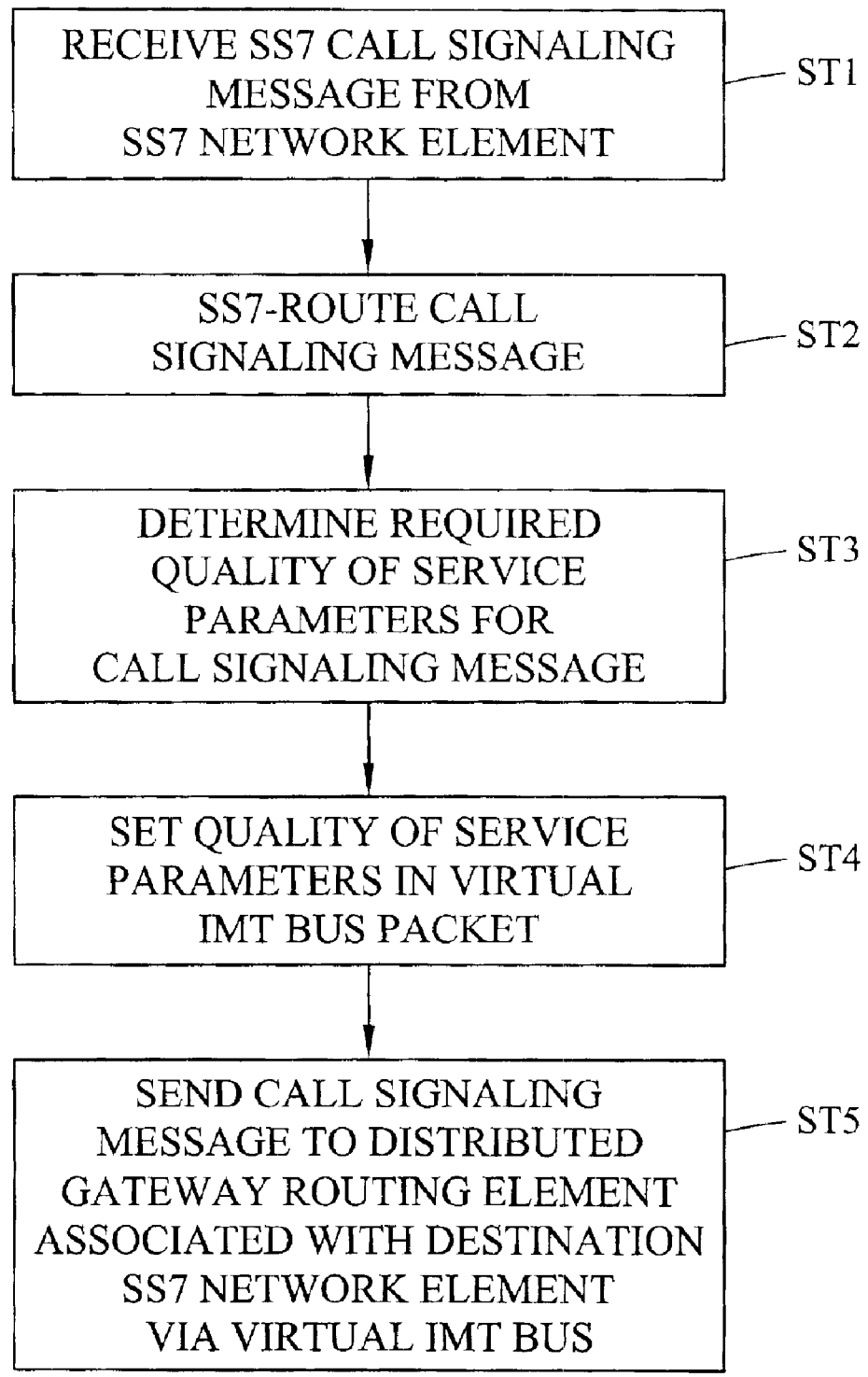
FIG. 8 is a flow chart illustrating exemplary steps that may be performed by a distributed gateway routing element in processing an incoming SS7 message from an SS7 network element and forwarding the SS7 message via the virtual IMT bus.

FIG. 8 is a flow chart illustrating exemplary steps that may be performed by a distributed gateway routing element according to an embodiment of the invention in routing an outgoing SS7 message packet over virtual IMT bus 314. Referring to FIG. 8, in step ST1, a distributed gateway routing element receives an SS7 call signaling message from an SS7 network element. For example, a distributed gateway routing element may receive an SS7 message from an SSP, an SCP, or an STP. In step ST2, distributed gateway routing element SS7-routes the call signaling message. SS7-routing the call signaling message may include examining the destination point code and other fields in the MTP layer 3 portion of the message to determine the destination SS7 network element. Once the destination SS7 network element is determined, in step ST3, the distributed gateway routing element determines the required quality of service parameters for the call signaling message. Determining the required quality of service parameters may include examining the SS7 message type to determine the time sensitivity of the message in accordance with SS7 standards.

In step ST4, the distributed gateway routing element sets the appropriate quality of service parameters in the virtual IMT bus packet. As discussed above, these parameters may include parameters in the flow label of an IPv6 header if the virtual IMT bus is implemented using IP version 6. Additional alternatives for providing quality of service may include setting the TOS field in the IPv4 header or adding an MPLS header to the SS7 message before sending the message over the virtual IMT bus.

In step ST5, the distributed gateway routing element sends the SS7 call signaling message to the distributed gateway routing element associated with the destination SS7 network element via the virtual IMT bus. For example, the destination SS7 network element may be a service control point. In this example, the SS7 call signaling message is delivered to the distributed gateway routing element associated with the service control point via virtual IMT bus 314. The routers between the distributed gateway routing elements may utilize the quality of service parameters in the virtual IMT bus packet that carries the SS7 message to provide the desired quality of service. As a result, SS7 messages can be delivered on time and with sufficient reliability in accordance with SS7 standards.

Figure 9:
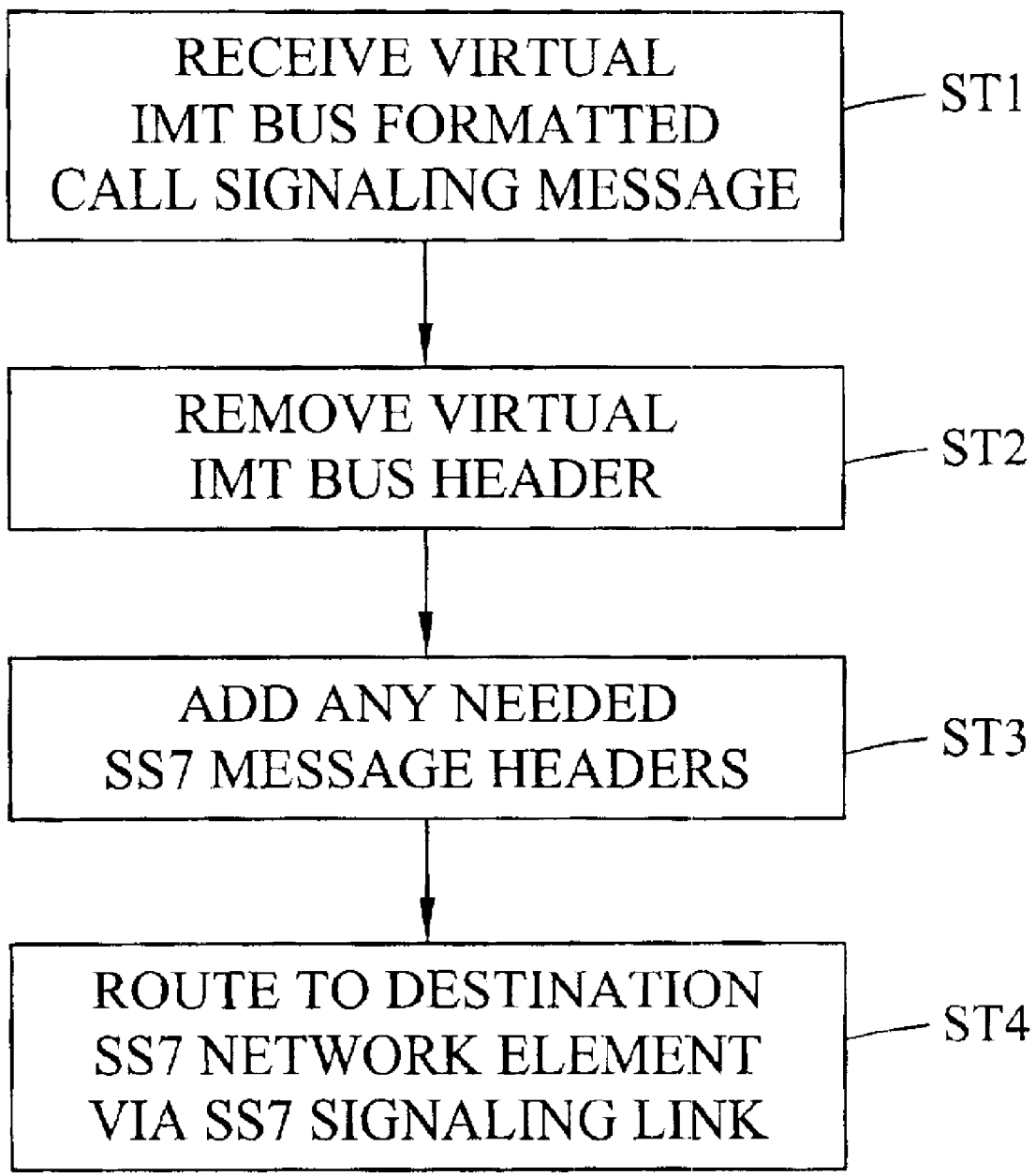
FIG. 9 is a flow chart illustrating exemplary steps that may be performed by a distributed gateway routing element in processing a message received via virtual IMT bus and routing the message to an SS7 network element via an SS7 signaling link.

FIG. 9 is a flow chart illustrating exemplary steps that may be performed by a distributed gateway routing element in processing and SS7 message packet received via virtual IMT bus 314. Referring to FIG. 9, in step ST1, distributed gateway routing element 310 receives a virtual IMT bus formatted call signaling message. In step ST2, the distributed gateway routing element removes the virtual IMT bus header from the call signaling message. In step ST3, the distributed gateway routing element adds any needed SS7 message headers. Finally, in step ST4, the distributed gateway routing element routes the SS7 message to the destination SS7 network via an SS7 signaling link.

Although the routing example described with respect to FIGS. 8 and 9 illustrates the steps for routing an SS7 signaling message from an SS7 network element, to a distributed gateway routing element, through virtual IMT bus 314, through another distributed gateway routing element, and to a destination SS7 network element, the present invention is not limited to such an embodiment. For example, in an alternative embodiment, an SS7 call signaling message may be routed from a source SS7 network element to a distributed gateway routing element, through virtual IMT bus 314, and to translation services module 312. An example of a message requiring such translation is an SCCP message requiring global title translation. Translation services module 312 receives the call signaling message, removes the virtual IMT bus header, performs the required translation service, and routes the message to the distributed gateway routing element associated with the destination SS7 network element. Translation services module 312 may include a quality of service manager process similar to that described with regard to the distributed gateway routing elements for setting the appropriate parameters in the outbound virtual IMT bus message so that the message will be delivered to its intended destination with the required quality of service.

DGRE Routing Tables and Route Update Message Exchange

According to another aspect of the invention, the distributed gateway routing elements exchange routing information via virtual IMT bus 314. More particularly, distributed gateway routing elements 310 illustrated in FIG. 3 may initially receive a routing table for routing messages to SS7 network elements from OA&M module 316. Table 1 shown below is an example of some of the information that may be included in the routing table.

TABLE 1

DGRE Routing Table

| Point Code | Destination Address | Link Status | Cost | Domain |
|---|---|---|---|---|
| 1-1-1 | 1.1.1.1 | Up | 1 | ANSI |
| 1-1-2 | 1.1.1.2 | Up | 2 | ANSI |
| 1-1-3 | 1.1.1.3 | Up | 2 | ITU |
| 1-1-4 | 1.1.1.4 | Down | INFINITE | ANSI |

In Table 1, SS7 point codes are translated to destination addresses, which in the illustrated example are IP addresses. However, the present invention is not limited to using IP addresses to locate distributed gateway routing elements. For example, as discussed above, in an alternative embodiment, MPLS labels may be used. In addition, other fields in incoming messages in addition to the point code may be used in routing the messages.

In Table 1, the status field indicates a status of a link associated with a distributed gateway routing element. The cost field allows the sending distributed gateway routing element to determine the least cost path over which the message should be routed. Finally, the domain field indicates the domain of the destination SS7 network element.

Routing tables may be initially loaded onto distributed gateway routing elements through OA&M module 316 via virtual IMT bus 314. Once the routing table is loaded, it is desirable to maintain current information in the routing table with regard to link status and cost. In order to maintain link status and cost information in distributed gateway routing element routing tables, distributed gateway routing elements 310 may exchange route update messages via virtual IMT bus 314. For example, when a link goes down between a DGRE and its associated SS7 network element, the DGRE may notify the other DGREs that the status of the link is down. In addition, if the cost associated with routing a message to an SS7 network element changes, the DGRE associated with the SS7 network element may notify the other DGREs of the change in cost in order for them to choose the least cost path for routing messages to that SS7 network element. By exchanging network management messages via virtual IMT bus 314, distributed gateway routing elements 310 maintain current routing information in their respective routing tables in a manner similar to a centralized node, such as a signal transfer point.

Thus, the present invention includes a distributed gateway that includes multiple routing elements that are co-located with SS7 network elements. The distributed gateway routing elements communicate with each other via a virtual IMT bus that guarantees a specified quality of service for SS7 call signaling messages. Because the distributed gateway routing elements are located at the individual nodes rather than in a centralized network node, the probability of a complete network outage due to failure of one of the distributed gateway routing elements is decreased. In addition, the expense of providing SS7 routing services can be distributed among owners of the various SS7 network elements. Finally, distributed gateway routing elements according to embodiments of the present invention are capable of selecting quality of service parameters for outgoing SS7 message packets to ensure on-time, reliable delivery of SS7 message packets.

It will be understood that various details of the invention may be changed without departing from the scope of the invention. Furthermore, the foregoing description is for the purpose of illustration only, and not for the purpose of limitation—the invention being defined by the claims.

What is claimed is:

1. A distributed call signaling message routing gateway comprising:

(a) a first distributed gateway routing element including a first interface for sending SS7 call signaling messages to and receiving SS7 call signaling messages from a first SS7 network element via a first SS7 signaling link and for performing SS7 routing functions for the SS7 messages received from the first SS7 network element and a second interface for sending the SS7-routed messages over a virtual bus and for setting quality of service parameters in the SS7-routed messages sent over the virtual bus, wherein the SS7 call signaling messages sent over the second interface include a plurality of different signaling message types and wherein setting quality of service parameters includes determining a required quality of service parameter for each SS7 call signaling message sent over the second interface based on the signaling message type of each SS7 call signaling message; and (b) at least one second distributed gateway routing element including a first interface for receiving the SS7-routed messages from the first distributed gateway routing element and a second interface for SS7-routing the received messages to a second SS7 network element via a second SS7 signaling link, wherein the first and second distributed gateway routing elements are adapted to be located at geographically diverse locations and to share an SS7 point code and thereby function as a geographically distributed STP associated with different SS7 signaling points.

2. The distributed gateway of claim 1 wherein the first interfaces of the first and second distributed gateway routing elements include SS7 MTP layer 3 routing functions for routing SS7 messages based on SS7 point codes.

3. The distributed gateway of claim 1 wherein the first interfaces of the first and second distributed gateway routing elements are adapted to route messages based on circuit identification codes.

4. The distributed gateway of claim 1 wherein the first interfaces are adapted to screen the SS7 call signaling messages based on one or more SS7 message parameters.

5. The distributed gateway of claim 1 wherein the first interfaces of the distributed gateway routing elements are adapted to copy the SS7 call signaling messages and forward the copies to a predetermined network monitoring or accounting node.

6. The distributed gateway of claim 1 wherein the distributed gateway routing elements each include a triggerless number portability process for identifying call signaling messages relating to calls to ported numbers and for overriding the SS7 routing functions for the call signaling messages related to calls directed to ported numbers.

7. The distributed gateway of claim 1 wherein the second interfaces of the first and second distributed gateway routing elements include protocol translation processes for translating the protocol of the SS7-routed messages to and from the protocol of the virtual bus.

8. The distributed gateway of claim 1 wherein the second interfaces of the first and second distributed gateway routing elements include quality of service manager processes for setting the quality of service parameters in the SS7-routed messages to be transmitted over the virtual bus.

9. The distributed gateway of claim 1 wherein the first and second distributed gateway routing elements are co-located with the first and second SS7 network elements.

10. The distributed gateway of claim 9 wherein the first and second distributed gateway routing elements are co-located with first and second geographically diverse service switching points (SSPs).

11. The distributed gateway of claim 9 wherein the first and second distributed gateway routing elements are co-located with first and second geographically diverse service control points (SCPs).

12. The distributed gateway of claim 9 wherein the first distributed gateway routing element is co-located with a service switching point and the second distributed gateway routing element is co-located with a service control point (SCP) located remotely from the service switching points.

13. The distributed gateway of claim 9 wherein at least one of the first and second distributed gateway routing elements is co-located with a signal transfer point (STP).

14. The distributed gateway of claim 9 wherein at least one of the first and second distributed gateway routing elements are co-located with a soft switch.

15. The distributed gateway of claim 9 wherein at least one of the distributed gateway routing elements is co-located with an application server.

16. The distributed gateway of claim 1 wherein at least one of the first and second distributed gateway routing elements are co-located with more than one SS7 network element.

17. The distributed gateway of claim 1 comprising a translation services module coupled to the first and second distributed gateway routing elements via the virtual bus for translating SS7-routed messages.

18. The distributed gateway of claim 17 wherein the translation services module is adapted to perform global title translation services for the SS7-routed messages.

19. The distributed gateway of claim 17 wherein the translation services module is adapted to perform directory number to Internet protocol address mapping for the SS7-routed messages.

20. The distributed gateway of claim 17 wherein the translation services module is adapted to perform number portability translation services for the SS7-routed messages.

21. The distributed gateway of claim 17 wherein the distributed gateway routing elements and the translation services module share a single SS7 point code and function collectively as a signal transfer point.

22. The distributed gateway of claim 1 wherein the first and second distributed gateway routing elements each comprise a general purpose computer.

23. The distributed gateway of claim 1 comprising an operations, administration, and maintenance element coupled to the first and second distributed gateway routing elements for provisioning and maintaining databases on the first and second distributed gateway routing elements.

24. The distributed gateway of claim 23 wherein the operations, administration, and maintenance element is coupled to the first and second distributed gateway routing elements via a simple network management protocol (SNMP) interface.

25. The distributed gateway of claim 1 wherein the virtual bus comprises an MPLS label switched path and wherein the first distributed gateway routing element is adapted to add an MPLS label to each of the SS7 signaling messages to be sent over the virtual bus, the MPLS label corresponding to a forwarding equivalence class preassigned to the SS7 signaling messages.

26. The distributed gateway of claim 25 wherein the first distributed gateway routing element is adapted to encapsulate each SS7 signaling message in an IP packet and to add an MPLS header including an MPLS label to the IP packet.

27. The distributed gateway of claim 26 wherein the first distributed gateway routing element is adapted to set an experimental use field in the MPLS header of each SS7 message to a predetermined value for indicating quality of service to be given to the SS7 messages within the forwarding equivalence class.

28. The distributed gateway of claim 1 wherein the first and second distributed gateway routing elements are adapted to exchange status information regarding the first and second SS7 signaling links with each other over the virtual bus.

29. A distributed gateway comprising:
(a) a first distributed gateway routing element co-located with an SS7 service switching point for receiving call signaling messages from the service switching point via an SS7 signaling link, for determining quality of service parameters for the call signaling messages, for generating and adding a header to each of the call signaling messages, the header including the quality of service parameters, and for forwarding the call signaling messages over a virtual bus, wherein the call signaling messages include a plurality of different signaling message types and wherein determining quality of service parameters for the call signaling messages includes determining the quality of service parameters based on the signaling message types of the call signaling messages; and
(b) a second distributed gateway routing element co-located with a second service switching point for receiving the call signaling messages from the virtual bus, removing the headers, and for forwarding the call signaling messages to the second service switching point via an SS7 signaling link, wherein the second distributed gateway routing element and the second service switching point are located remotely from the first distributed gateway routing element and the first service switching point, and wherein the first and second distributed gateway routing elements share an SS7 point code and thereby function as a geographically distributed STP having routing elements located at different SS7 service switching points.

30. The distributed gateway of claim 29 comprising a third distributed gateway routing element coupled to the first and second distributed gateway routing elements via the virtual bus, the third distributed gateway routing element being co-located with an SS7 service control point for sending and receiving call signaling messages via the virtual bus with a specified quality of service.

31. The distributed gateway of claim 29 comprising a translation services module coupled to the first and second distributed gateway routing elements via the virtual bus for performing SS7 translation operations on received call signaling messages and for forwarding the translated call signaling messages to one of the first and second distributed gateway routing elements via the virtual bus.

32. The distributed gateway of claim 31 wherein the translation services module is adapted to convert the call signaling messages between American National Standards Institute (ANSI) to International Telecommunications Union (ITU) message formats.

33. The distributed gateway of claim 29 comprising an operations, administration, and maintenance module coupled to the first and second distributed gateway routing elements via the virtual bus for provisioning and maintaining databases associated with the first and second distributed gateway routing elements.

34. The distributed gateway of claim 29 wherein the virtual bus comprises an MPLS label switched path and wherein the first distributed gateway routing element is adapted to add an MPLS label to each of the SS7 signaling messages to be sent over the virtual bus, the MPLS label corresponding to a forwarding equivalence class preassigned to the SS7 signaling messages.

35. The distributed gateway of claim 34 wherein the first distributed gateway routing element is adapted to encapsulate each SS7 signaling message in an IP packet and to add an MPLS header including an MPLS label to the IP packet.

36. The distributed gateway of claim 35 wherein the first distributed gateway routing element is adapted to set an experimental use field in the MPLS header of each SS7 message to a predetermined value for indicating quality of service to be given to the SS7 messages within the forwarding equivalence class.

37. The distributed gateway of claim 29 wherein the first and second distributed gateway routing elements are adapted to exchange status information regarding the first and second SS7 signaling links with each other over the virtual bus.

38. A method for routing SS7 messages using a distributed gateway, the method comprising:

(a) sharing an SS7 point code between first and second geographically distributed routing elements respectively co-located with first and second SS7 network elements and thereby functioning as a geographically distributed STP;

(b) receiving, at the first routing element, an SS7 call signaling message from a first SS7 network element via a first SS7 signaling link;

(c) performing SS7 routing operations on the SS7 call signaling message;

(d) determining quality of service parameters for the SS7 call signaling message, wherein SS7 call signaling messages sent or received by the first routing element include a plurality of different signaling message types and wherein determining quality of service parameters for the call signaling message includes, at the first routing element, determining quality of service parameters based on the signaling message type of the SS7 call signaling message;

(e) adding a virtual bus header to the SS7 call signaling message and setting the quality of service parameters in the virtual bus header; and (f) sending the call signaling message over the virtual bus to the second routing element associated with the second SS7 network element.

39. The method of claim 38 wherein setting quality of service parameters in the virtual bus header includes setting a parameter in a flow label field of an Internet protocol version 6 header.

40. The method of claim 38 wherein setting quality of service parameters in the virtual bus header includes writing a predetermined value into a type of service (TOS) field in an IP version 4 header.

41. The method of claim 38 wherein setting quality of service parameters in the virtual bus header includes adding a multiprotocol label switching (MPLS) header to the call signaling message.

42. The method of claim 38 comprising exchanging signaling link status information between the first and second routing elements to update SS7 routing tables maintained by the first and second routing elements.

43. The method of claim 39 wherein setting a parameter in a flow label field of an Internet protocol version 6 header includes inserting a traffic class value in the flow label field indicating high time sensitivity.

44. The method of claim 40 wherein writing a predetermined value into a type of service field in an IP version 4 header includes setting a precedence value in a precedence field of the type of service header indicating high priority and setting a delay bit in the type of service field indicating low delay transport.

45. The method of claim 41 wherein adding an MPLS header to the call signaling message includes inserting an MPLS label in the MPLS header, the MPLS label corresponding to a forwarding equivalence class preassigned to the call signaling message.

46. The method of claim 45 comprising setting an experimental use field in the MPLS label to a predetermined value for indicating quality of service to be given to the call signaling message within the forwarding equivalence class.

* * * * *